(12) United States Patent
Wang

(10) Patent No.: US 12,142,151 B2
(45) Date of Patent: Nov. 12, 2024

(54) FLIGHT LOG UPLOADING METHOD, DEVICE, MOBILE TERMINAL AND UNMANNED AERIAL VEHICLE

(71) Applicant: AUTEL ROBOTICS CO., LTD., Guangdong (CN)

(72) Inventor: Bingchun Wang, Guangdong (CN)

(73) Assignee: AUTEL ROBOTICS CO., LTD., Guangdong (CN)

(*) Notice: Subject to any disclaimer, the term of this patent is extended or adjusted under 35 U.S.C. 154(b) by 795 days.

(21) Appl. No.: 17/371,432

(22) Filed: Jul. 9, 2021

(65) Prior Publication Data

US 2021/0335138 A1 Oct. 28, 2021

Related U.S. Application Data

(63) Continuation of application No. PCT/CN2020/070959, filed on Jan. 8, 2020.

(30) Foreign Application Priority Data

Jan. 9, 2019 (CN) .......................... 201910018090.X

(51) Int. Cl.
*G08G 5/00* (2006.01)
*B64C 39/02* (2023.01)

(52) U.S. Cl.
CPC ......... *G08G 5/0039* (2013.01); *B64C 39/024* (2013.01); *G08G 5/0013* (2013.01); *G08G 5/0052* (2013.01)

(58) Field of Classification Search
None
See application file for complete search history.

(56) References Cited

U.S. PATENT DOCUMENTS 9,959,334 B1 5/2018 Bar-Zeev et al.
2014/0018976 A1* 1/2014 Goossen ............... G07C 5/008
701/2

(Continued)

FOREIGN PATENT DOCUMENTS

CN 102147763 A 8/2011
CN 104900037 A 9/2015

(Continued)

OTHER PUBLICATIONS

Bouafif et al., "Drone Forensics: Challenges and New Insights", Feb. 1, 2018, IEEE, 2018 9th IFIP International Conference on New Technologies, Mobility and Security (NTMS) (2018, pp. 1-6) (Year: 2018).*

(Continued)

*Primary Examiner* — Davoud A Zand
(74) *Attorney, Agent, or Firm* — Frank Gao, Esq.

(57) ABSTRACT

Embodiments of the present invention relate to the technical field of flight logs, and in particular, to a flight log uploading method, device, mobile terminal and unmanned aerial vehicle (UAV). The flight log uploading method is applicable to a mobile terminal. The method includes: receiving a trigger operation from a user, the trigger operation being used to confirm a flight log uploading instruction; transmitting a log transmission channel establishment instruction to a UAV according to the flight log uploading instruction, so that the UAV establishes a log transmission channel, where the UAV is communicatively connected to the mobile terminal; and acquiring a flight log of the UAV by using the log transmission channel and synchronously uploading the flight log to a server. In this way, the embodiments of the present invention can avoid flight log errors caused by faulty operations and can improve an accuracy of flight log uploading.

20 Claims, 3 Drawing Sheets

(56) References Cited

U.S. PATENT DOCUMENTS

2018/0047295 A1* 2/2018 Ricci ................... G08G 5/0039
2018/0295110 A1   10/2018 Chen et al.
2019/0303982 A1* 10/2019 Michel ................ B64C 39/024
2021/0110723 A1* 4/2021 Tazume ................ G08G 5/045

FOREIGN PATENT DOCUMENTS

| CN | 105100249 A | 11/2015 |
| CN | 105657261 A | 6/2016 |
| CN | 106412093 A | 2/2017 |
| CN | 106683491 A | 5/2017 |
| CN | 106713491 A | 5/2017 |
| CN | 107113161 A | 8/2017 |
| CN | 107331213 A | 11/2017 |
| CN | 108268528 A | 7/2018 |
| CN | 108475065 A | 8/2018 |
| CN | 108875075 A | 11/2018 |
| CN | 109714830 A | 5/2019 |
| TW | 201702911 A | 1/2017 |
| WO | 2018133592 A1 | 7/2018 |

OTHER PUBLICATIONS

The Extended European Search Report dated Jan. 17, 2022; Appln. No. 20739186.3.
The First Chinese Office Action dated Apr. 1, 2020; Appln. No. 201910018090.X.
International Search Report mailed Mar. 17, 2020; PCT/CN2020/070959.

* cited by examiner

FLIGHT LOG UPLOADING METHOD, DEVICE, MOBILE TERMINAL AND UNMANNED AERIAL VEHICLE

CROSS REFERENCE

This application is a continuation of International Application No. PCT/CN2020/070959, filed on Jan. 8, 2020, which claims priority to Chinese Patent Application No. 201910018090X filed on Jan. 9, 2019, which is incorporated herein by reference in its entirety.

BACKGROUND

Technical Field

Embodiments of the present invention relate to the technical field of flight logs, and in particular, to a flight log uploading method, device, mobile terminal and unmanned aerial vehicle (UAV).

Related Art

A UAV is a drone operated by a radio remote control device or its program control apparatus. During flight of a UAV, the UAV generates a flight log recording relevant data of working statuses of devices and modules during the flight. When an abnormality occurs to the UAV during the flight, the flight log may be uploaded to a server for technical analysis, so as to determine a cause of the abnormality of the UAV.

Currently, to upload the flight log to the server, the UAV first establishes a connection to a mobile terminal and then transmits the flight log to the mobile terminal, and then the mobile terminal uploads, to the server, a flight log selected by a user according to the selection operation of the user. However, during implementation of the present invention, the inventor found that flight log errors are likely to occur as a result of faulty operations during the operation performed by the user on the flight log before the mobile terminal uploads the flight log to the server according to the selection operation of the user. As a result, the determined cause of the abnormality of the UAV is inaccurate.

SUMMARY

Embodiments of the present invention are intended to provide a flight log uploading method, device, mobile terminal, and UAV, which can avoid flight log errors caused by faulty operations and can improve an accuracy of flight log uploading.

In order to resolve the foregoing technical problem, an embodiment of the present invention provides a flight log uploading method applicable to a mobile terminal. The method includes:
  receiving a trigger operation from a user, the trigger operation being used to confirm a flight log uploading instruction;
  transmitting a log transmission channel establishment instruction to a UAV according to the flight log uploading instruction, so that the UAV establishes a log transmission channel, where the UAV is communicatively connected to the mobile terminal;
  acquiring a flight log of the UAV by using the log transmission channel; and
  synchronously uploading the flight log to a server.

Optionally, the log transmission channel is a communication link established among a flight control system of the UAV, a first image transmission module of the UAV and a second image transmission module of the mobile terminal.

Optionally, before the synchronously uploading the flight log to a server, the method further includes:
  storing the flight log in an encrypted storage area, where the encrypted storage area is a read-only storage area.
The synchronously uploading the flight log to a server includes:
  uploading the flight log to the server by using the encrypted storage area.

Optionally, before the uploading the flight log to the server by using the encrypted storage area, the method further includes:
  receiving a cutoff indication transmitted from the UAV to determine that the acquisition of the flight log is completed.

In order to resolve the foregoing technical problem, another embodiment of the present invention provides a flight log uploading method applicable to a UAV. The method includes:
  receiving a log transmission channel establishment instruction transmitted from a mobile terminal, where the mobile terminal is communicatively connected to the UAV;
  establishing a log transmission channel according to the log transmission channel establishment instruction; and
  transmitting a flight log to the mobile terminal by using the log transmission channel and synchronously uploading the flight log to a server by using the mobile terminal.

Optionally, the UAV includes a flight control system and a first image transmission module, the mobile terminal includes a second image transmission module, and the establishing a log transmission channel according to the log transmission channel establishment instruction includes:
  establishing a connection between the flight control system and the first image transmission module according to the log transmission channel establishment instruction; and
  connecting the first image transmission module to the second image transmission module to form the log transmission channel among the flight control system, the first image transmission module and the second image transmission module.

Optionally, before the establishing a log transmission channel according to the log transmission channel establishment instruction, the method further includes:
  determining that the UAV is powered on but is not started, to ensure that the UAV does not generate a new flight log.

Optionally, the method further includes:
  cutting off the log transmission channel and transmitting a cutoff indication to the mobile terminal when it is determined that the transmission of the flight log is completed.

In order to resolve the foregoing technical problem, another embodiment of the present invention provides a flight log uploading device applicable to a mobile terminal. The device includes:
  a first receiving unit, configured to receive a trigger operation from a user, the trigger operation being used to confirm a flight log uploading instruction;
  a first transmission unit, configured to transmit a log transmission channel establishment instruction to a UAV according to the flight log uploading instruction, so that the UAV establishes a log transmission channel, where the UAV is communicatively connected to the mobile terminal;

an acquisition unit, configured to acquire a flight log of the UAV by using the log transmission channel; and an uploading unit, configured to synchronously upload the flight log to a server.

Optionally, the log transmission channel is a communication link established among a flight control system of the UAV, a first image transmission module of the UAV and a second image transmission module of the mobile terminal.

Optionally, the acquisition unit is further configured to:

store the flight log in an encrypted storage area, where the encrypted storage area is a read-only storage area.

The uploading unit is further configured to:

synchronously upload the flight log to the server by using the encrypted storage area.

Optionally, the first receiving unit is further configured to:

receive a cutoff indication transmitted from the UAV to determine that the acquisition of the flight log is completed.

In order to resolve the foregoing technical problem, another embodiment of the present invention provides a flight log uploading device applicable to a UAV. The device includes:

a second receiving unit, configured to receive a log transmission channel establishment instruction transmitted from a mobile terminal, wherein the mobile terminal is communicatively connected to the UAV;

an establishment unit, configured to establish a log transmission channel according to the log transmission channel establishment instruction; and a second transmission unit, configured to transmit a flight log to the mobile terminal by using the log transmission channel and synchronously upload the flight log to a server by using the mobile terminal.

Optionally, the UAV includes a flight control system and a first image transmission module, the mobile terminal includes a second image transmission module, and the establishment unit is further configured to:

establish a connection between the flight control system and the first image transmission module according to the log transmission channel establishment instruction; and connect the first image transmission module to the second image transmission module to form the log transmission channel among the flight control system, the first image transmission module and the second image transmission module.

Optionally, the apparatus further includes:

a determination unit, configured to determine that the UAV is powered on but is not started, to ensure that the UAV does not generate a new flight log.

Optionally, the determination unit is further configured to:

cut off the log transmission channel and transmit a cutoff indication to the mobile terminal when it is determined that the transmission of the flight log is completed.

In order to resolve the foregoing technical problem, another embodiment of the present invention provides a mobile terminal, including:

at least one processor; and a memory communicatively connected to the at least one processor, where the memory stores instructions executable by the at least one processor, the instructions, when executed by the at least one processor, causing the at least one processor to perform the foregoing flight log uploading method.

In order to resolve the foregoing technical problem, another embodiment of the present invention provides a non-volatile computer-readable storage medium storing computer-executable instructions, the computer-executable instructions being used to cause a mobile terminal to perform the foregoing flight log uploading method.

In order to resolve the foregoing technical problem, another embodiment of the present invention provides a UAV, including:

at least one processor; and a memory communicatively connected to the at least one processor, where the memory stores instructions executable by the at least one processor, the instructions, when executed by the at least one processor, causing the at least one processor to perform the foregoing flight log uploading method.

In order to resolve the foregoing technical problem, another embodiment of the present invention provides a non-volatile computer-readable storage medium storing computer-executable instructions. The computer-executable instructions are used to cause a UAV to perform the foregoing flight log uploading method.

The embodiments of the present invention have the following beneficial effects: different from the prior art, the embodiments of the present invention provide a flight log uploading method, device, mobile terminal and UAV. In the flight log uploading method, the mobile terminal receives the trigger operation from the user, the trigger operation being used to confirm the flight log uploading instruction, and transmits the log transmission channel establishment instruction to the UAV according to the conformed flight log uploading instruction, so that the UAV establishes the log transmission channel according to the log transmission channel establishment instruction, and then the mobile terminal acquires the flight log of the UAV by using the log transmission channel and synchronizes the flight log to the server. In other words, the mobile terminal does not acquire the flight log of the UAV until the user triggers the operation. At this time, the flight log does not exist in the mobile terminal, and therefore the user cannot perform operations on the flight log, which can avoid flight log errors caused by faulty operations and can improve an accuracy of uploading the flight log to the server.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

Figure 1:
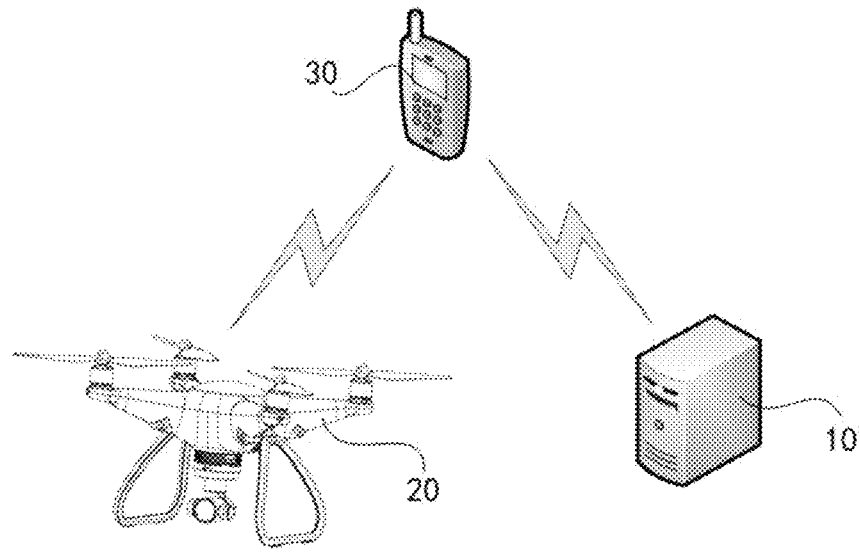
FIG. 1 is a schematic structural diagram of an implementation environment of a flight log uploading method according to an embodiment of the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present application rather than all of the embodiments. It should be understood that the specific embodiments described herein are merely used to explain the present invention but are not intended to limit the present invention. All other embodiments obtained by a person of ordinary skill in the art based on the embodiments of the present invention without creative effects shall fall within the protection scope of the present invention.

It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of the specification, orientation or position relationships indicated by the terms such as "vertical", "horizontal", "left", "right", "up", "down", "inside", "outside" and "bottom" are based on orientation or position relationships shown in the accompanying drawings, and are used only for ease and brevity of illustration and description of the present invention, rather than indicating or implying that the mentioned apparatus or element needs to have a particular orientation or needs to be constructed and operated in a particular orientation. Therefore, such terms should not be construed as limiting of the present invention. In addition, terms "first", "second" and "third" are only used to describe the objective and cannot be understood as indicating or implying relative importance, and similar expressions used in this specification are merely used for the purpose of description.

Unless otherwise defined, meanings of all technical and scientific terms used in this specification are the same as those generally understood by a person skilled in the technical field to which the present invention belongs. In the present invention, terms used in the specification of the present invention are merely intended to describe objectives of the specific embodiments, but are not intended to limit the present invention. A term "and/or" used in this specification includes any or all combinations of one or more related listed items.

In addition, technical features involved in the embodiments of the present invention described below may be combined with each other provided that there is no conflict between each other.

For users or manufacturers, understanding an actual operating status of a UAV or clearly knowing a cause of abnormality of the UAV mainly depends on a series of flight logs (also referred to as log data) recorded in the UAV a specific data format. However, the flight logs are directly recorded or stored in the UAV in data formats different from a general mode. As a result, it is difficult to perform technical analysis on the flight logs before they are uploaded to a server. In a current flight log uploading method, after a mobile terminal acquires a flight log of a UAV by using a USB connection, the mobile terminal uploads the flight log to a server according to a selection operation performed by a user on the flight log. However, during the operation performed by the user on the flight log, flight log errors are likely to be caused as a result of faulty operations. Therefore, the present invention provides a flight log uploading method, which can prevent a user from performing operations on a flight log and can improve an accuracy of flight log uploading.

In the present invention, the flight log uploading method includes a flight log uploading method applicable to a mobile terminal and a flight log uploading method applicable to a UAV, to achieve accurate uploading of a flight log by means of cooperation between the mobile terminal and the UAV.

The present invention will be described below in detail by using specific embodiments.

Embodiment I

FIG. 1 is a schematic structural diagram of an implementation environment of a flight log uploading method according to an embodiment of the present invention. The implementation environment includes a server 10, a UAV 20 and a mobile terminal 30. The mobile terminal 30 is communicatively connected to the server 10 and the UAV 20.

The server 10 is a central processor configured to perform technical analysis on a flight log, which may be a server, a server cluster composed of a plurality of servers or a cloud computing service center.

The UAV 20 is an unmanned flying vehicle that can provide a user with a load-bearing capacity, a flight speed and a flight endurance mileage that satisfy use requirements, which may be any suitable type of high-altitude UAVs or low-altitude UAVs, including but not limited to a fixed-wing UAV, a rotor UAV, a parasol-wing UAV and the like.

One or more devices and modules may be mounted to the UAV 20 to perform corresponding tasks by using the devices and the modules mounted thereto. For example, the UAV 20 may perform an aerial reconnaissance mission by using a high-resolution camera mounted thereto.

Figure 2:
FIG. 2 is a schematic structural diagram of a UAV in the implementation environment shown in FIG. 1.

Further, referring to FIG. 2, the UAV 20 includes a flight control system 21 and a first image transmission module 22.

The flight control system 21 is configured to generate a flight log. The flight log is relevant data representing working statuses of the devices and the modules that is recorded in a specific data format during flight of the UAV 20, such as a current and an output power of a driving motor, a fully charged level and a remaining level of a battery, a measurement result (an attitude angle) of an inertial measurement module and the like.

The flight control system 21 is further configured to maintain a normal flight attitude of the UAV 20, receive a control instruction to adjust a heading of the UAV 20 or control the UAV 20 to lift or descend, and the like.

The flight control system 21 may adopt any type of central processing units, microcontrollers or similar logic processing chips.

The first image transmission module 22 is configured to establish a connection to the flight control system 21. After the first image transmission module 22 establishes a connection to the flight control system 21, a flight log generated by the flight control system 21 may be outputted by using the first image transmission module 22. At this time, if the first image transmission module 22 is connected to the mobile terminal 30, the flight log can be transmitted to the mobile terminal 30.

The mobile terminal 30 is located on a user side and is configured to interact with a user. In order to achieve interaction with the user, the mobile terminal 30 is usually configured with one or more input/output devices, such as a display screen, a button, a touch screen and the like. The mobile terminal 30 can feed back relevant information to the user by using the input/output device and collect a trigger operation of the user. For example, when the mobile terminal 30 displays an uploading button on the touch screen, the uploading button feeds back to the user the following information: "The uploading button can trigger an uploading instruction". When the user taps the uploading button, the mobile terminal 30 may collect the tap operation of the user from the touch screen, and may conform an uploading instruction according to the collected tap operation. At this time, the mobile terminal 30 may perform a corresponding uploading method according to the uploading instruction.

In the embodiments of the present invention, the mobile terminal 30 may be an electronic device capable of running applications, such as a smart phone, a tablet computer or the like. The mobile terminal 30 interacts with the user by using a log uploading program additionally provided for the UAV 20 by a supplier or a service provider running the UAV 20. One or more users may bind or register one or more UAVs 20 by using the log uploading program. In an interactive interface provided in the log uploading program, a flight log uploading button is configured. The flight log uploading button corresponds to a flight log uploading instruction. When the user taps the flight log uploading button in the interactive interface, the mobile terminal 30 may collect a trigger operation for confirming the flight log uploading instruction. After the mobile terminal 30 is communicatively connected to the one or more UAVs 20 that are bound or registered, the mobile terminal 30 may acquire, according to the flight log uploading instruction, flight logs in the UAVs 20 connected to the mobile terminal for uploading. The mobile terminal 30 is communicatively connected to the UAVs 20 by using a wireless network. Certainly, in some alternative embodiments, the flight log uploading button may be triggered by means of operations such as double-tapping, sliding, long-pressing or the like, which is not limited to the manner described in this embodiment.

Figure 3:
FIG. 3 is a schematic structural diagram of a mobile terminal in the implementation environment shown in FIG. 1.

Further, referring to FIG. 3, the mobile terminal 30 includes a second image transmission module 31 and an encrypted storage area 32. The second image transmission module 31 is connected to the encrypted storage area 32. The mobile terminal 30 is connected to the first image transmission module 22 of the UAV 20 by using the second image transmission module 31, to form a unidirectional log transmission channel among the flight control system 21, the first image transmission module 22 and the second image transmission module 31. The log transmission channel is a communication link established among the flight control system of the UAV, the first image transmission module of the UAV and the second image transmission module of the mobile terminal. The mobile terminal 30 acquires a flight log from the UAV 20 by using the log transmission channel. The flight log acquired by the mobile terminal 30 by using the log transmission channel is stored in the encrypted storage area 32. The encrypted storage area 32 is a read-only storage area, and therefore the user cannot tamper with the flight log, ensuring an accuracy of the flight log. The mobile terminal 30 is further connected to the server 10 by using the encrypted storage area 32, to upload the flight log to the server 10, further ensuring the accuracy of the flight log.

The encrypted storage area 32 of the mobile terminal 30 is connected to the server 10 by using a wired network or a wireless network.

It may be understood that, in the implementation environment of this embodiment of the present invention, when the user needs to upload the flight log, the user first taps the flight log uploading button in the mobile terminal 30. At this time, the mobile terminal 30 receives the trigger operation for confirming the flight log uploading instruction, and transmits, according to the flight log uploading instruction, a log transmission channel establishment instruction to the UAV 20 communicatively connected to the mobile terminal 30.

After receiving the log transmission channel establishment instruction transmitted from the mobile terminal 30, the UAV 20 first determines whether the UAV 20 is powered on but is not started, so as to ensure that the UAV does not generate a new flight log.

The expression "powered on but is not started" means that the UAV 20 is stationary on the ground and does not fly after being powered on.

The UAV 20 flies by means of rotation of a propeller. The rotation of the propeller is controlled by the driving motor. If the driving motor is started, the propeller rotates, and the UAV 20 flies or hovers. If the driving motor is not started, the propeller does not rotate, and the UAV 20 lands on the ground and remains stationary. Therefore, the UAV 20 may determine whether the UAV 20 is powered on but is not started by determining a status of the driving motor. If the UAV 20 is powered on and the driving motor is started, it is determined that the UAV 20 is powered on and started. If the UAV 20 is powered on but the driving motor is not started, it is determined that the UAV 20 is powered on but is not started.

The UAV 20 may determine the status of the driving motor according to a current of the driving motor. If the current of the driving motor is 0, it is determined that the driving motor is not started. If the current of the driving motor is greater than 0, it is determined that the driving motor is started.

When it is determined that the UAV 20 is powered on but is not started, establishing, by the UAV 20, the log transmission channel according to the log transmission channel establishment instruction includes: establishing a connection between the flight control system 21 and the first image transmission module 22, and connecting the first image transmission module 22 to the second image transmission module 31 of the mobile terminal 30, to form a unidirectional log transmission channel among the flight control system 21, the first image transmission module 22 and the second image transmission module 31.

After establishing the log transmission channel, the UAV 20 transmits a generated flight log to the mobile terminal 30 by using the log transmission channel.

Then, the mobile terminal 30 acquires the flight log generated by the UAV 20 by using the log transmission channel and stores the acquired flight log in the encrypted storage area.

When the UAV 20 determines that the transmission of the flight log is completed, the UAV 20 cuts off the log transmission channel and transmits a cutoff indication to the mobile terminal 30.

The UAV 20 may determine whether the transmission of the flight log is completed according to a size of data that has been transmitted. If the size of the data that has been transmitted is less than a size of the flight log generated by the flight control system 21, it is determined that the transmission of the flight log is not completed, or otherwise, it is determined that the transmission of the flight log is completed.

The UAV 20 may cut off the log transmission channel by disconnecting the flight control system 21 from the first image transmission module 22.

Finally, when the mobile terminal 30 receives the cutoff indication transmitted from the UAV 20, the mobile terminal 30 determines that the log transmission channel is cut off and that the acquisition of the flight log is completed. At this time, the mobile terminal 30 uploads the flight log to the server 10 by using the encrypted storage area to ensure an integrity and an accuracy of the flight log.

In this embodiment of the present invention, the mobile terminal controls, by using the received trigger operation, the UAV to establish the log transmission channel, and then acquires the flight log of the UAV by using the log transmission channel, so that the flight log does not exist in the mobile terminal when the user operates the mobile terminal, which can prevent the user from performing operations on the flight log and can improve an accuracy of flight log uploading.

Embodiment II

Figure 4:
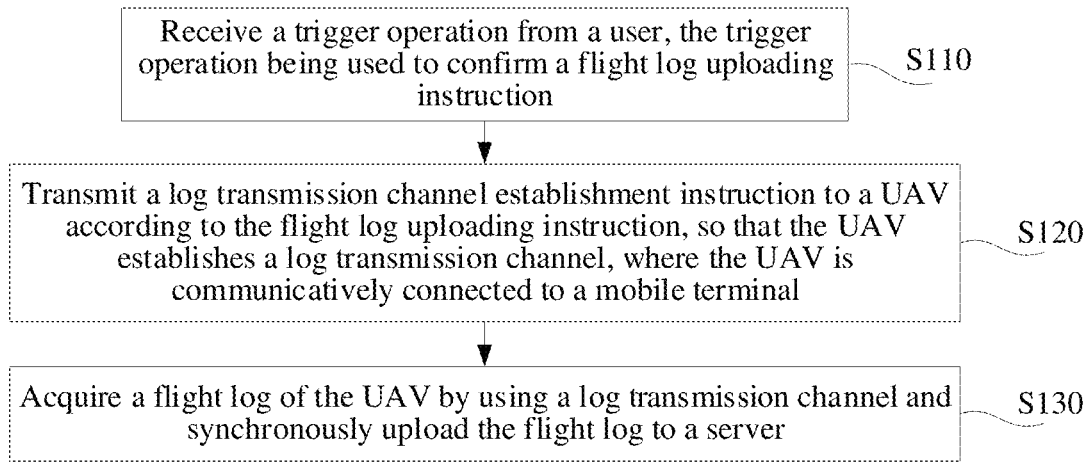
FIG. 4 is a schematic flowchart of a flight log uploading method applicable to a mobile terminal according to an embodiment of the present invention.

FIG. 4 is a schematic flowchart of a flight log uploading method applicable to a mobile terminal according to an embodiment of the present invention. The mobile terminal is the mobile terminal 30 described in the foregoing embodiment. The flight log uploading method includes the following steps:

S110: Receive a trigger operation from a user, the trigger operation being used to confirm a flight log uploading instruction.

In this embodiment of the present invention, the mobile terminal runs a log uploading program additionally provided for a UAV by a supplier or a service provider of the UAV. The user may bind or register one or more UAVs by using the log uploading program. In an interactive interface provided in the log uploading program, a flight log uploading button is configured. The flight log uploading button corresponds to a flight log uploading instruction. When the user performs a trigger operation on the flight log uploading button, the mobile terminal may collect the trigger operation for conforming the flight log uploading instruction.

The trigger operation means actions performed by the user on an input/output device of the mobile terminal, including but not limited to tapping, double-tapping, sliding, long-pressing and the like. The mobile terminal may collect the trigger operation of the user by using the input/output device.

The input/output device includes but is not limited to a display screen, a button, a touch screen and the like. The foregoing interactive interface of the log uploading program may be displayed on the input/output device such as a display screen or a touch screen.

S120: Transmit a log transmission channel establishment instruction to a UAV according to the flight log uploading instruction, so that the UAV establishes a log transmission channel, where the UAV is communicatively connected to the mobile terminal.

In this embodiment of the present invention, the log transmission channel is a communication link established among a flight control system of the UAV, a first image transmission module of the UAV, and a second image transmission module of the mobile terminal, which is formed after the flight control system, the first image transmission module, and the second image transmission module are connected. The log transmission channel is dedicated for transmitting flight logs and is a unidirectional transmission channel allowing transmission of the flight log from the UAV to the mobile terminal.

After the UAV receives the log transmission channel establishment instruction, when it is determined that the UAV is powered on but is not started, establishing the log transmission channel according to the log transmission channel establishment instruction includes: establishing a connection between the flight control system and the first image transmission module, and establishing a connection between the first image transmission module and the second image transmission module, to form the log transmission channel among the flight control system, the first image transmission module and the second image transmission module.

The expression "the UAV is powered on but is not started" means that the UAV is still stationary on the ground and does not fly after being powered on.

The UAV flies by means of rotation of a propeller. The rotation of the propeller is controlled by a driving motor. If the driving motor is started, the propeller rotates, and the UAV flies or hovers. If the driving motor is not started, the propeller does not rotate, and the UAV lands on the ground and remains stationary. Therefore, the UAV may determine whether the UAV is powered on but is not started by determining a status of the driving motor. If the UAV is powered on and the driving motor is started, it is determined that the UAV is powered on and started. If the UAV is powered on but the driving motor is not started, it is determined that the UAV is powered on but is not started.

The UAV may determine the status of the driving motor according to a current of the driving motor. If the current of the driving motor is 0, it is determined that the driving motor is not started. If the current of the driving motor is greater than 0, it is determined that the driving motor is started.

S130: Acquire a flight log of the UAV by using the log transmission channel and upload the flight log to a server.

In this embodiment of the present invention, the flight log is relevant data representing working statuses of devices and modules that is recorded in a specific data format during flight of the UAV, such as a current and an output power of a driving motor, a fully charged level and a remaining level of a battery, a measurement result (an attitude angle) of an inertial measurement module and the like.

Technical analysis needs to be performed on the flight log by the server to obtain an actual operating status of the UAV or a cause of an abnormality of the UAV. Therefore, after obtaining the flight log of the UAV, the mobile terminal uploads the flight log to the server.

The mobile terminal is communicatively connected to the server by using a wired network or a wireless network.

The mobile terminal further includes an encrypted storage area, which is a read-only storage area and is connected to the second image transmission module and the server. Therefore, in another embodiment of the present invention, before uploading the flight log to the server, the mobile terminal stores the flight log in the encrypted storage area, and then uploads the flight log to the server by using the encrypted storage area, so that the user cannot tamper with the flight log, ensuring accuracy of the flight log.

In still another embodiment of the present invention, in order to ensure integrity of the flight log that is uploaded, the mobile terminal receives a cutoff indication transmitted from the UAV, and uploads the flight log to the server by using the encrypted storage area only after determining that the acquisition of the flight log is completed.

In this embodiment of the present invention, the mobile terminal controls, by using the received trigger operation, the UAV to establish the log transmission channel, and then acquires the flight log of the UAV by using the log transmission channel, so that the flight log does not exist in the mobile terminal when the user operates the mobile terminal, which can prevent the user from performing operations on the flight log and can improve an accuracy of flight log uploading.

Embodiment III

Figure 5:
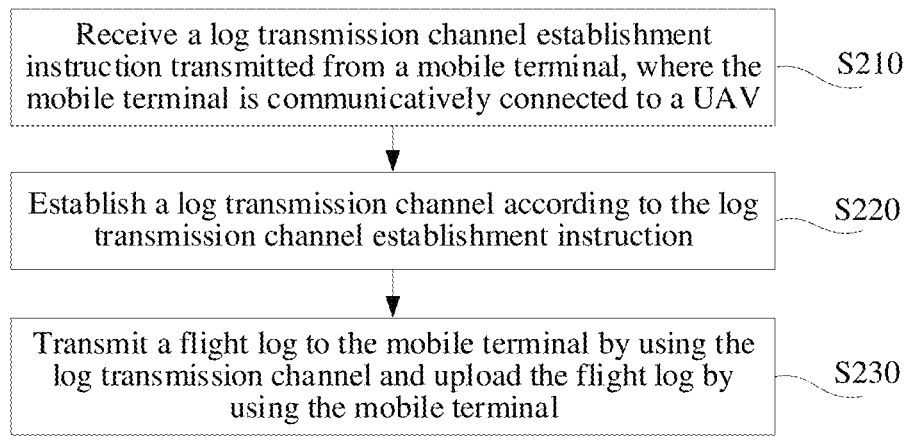
FIG. 5 is a schematic flowchart of a flight log uploading method applicable to a UAV according to an embodiment of the present invention.

FIG. 5 is a schematic flowchart of a flight log uploading method applicable to a UAV according to an embodiment of the present invention. The UAV is the UAV 20 described in the foregoing embodiment. The flight log uploading method includes the following steps:

S210: Receive a log transmission channel establishment instruction transmitted from a mobile terminal, where the mobile terminal is communicatively connected to the UAV.

In this embodiment of the present invention, the UAV is communicatively connected to the mobile terminal by using a wireless network, so that the UAV can receive, by using the wireless network, the log transmission channel establishment instruction transmitted from the mobile terminal.

S220: Establish a log transmission channel according to the log transmission channel establishment instruction.

In this embodiment of the present invention, the log transmission channel is a communication link established among a flight control system of the UAV, a first image transmission module of the UAV, and a second image transmission module of the mobile terminal, which is formed after the flight control system, the first image transmission module, and the second image transmission module are connected. The log transmission channel is dedicated for transmitting flight logs and is a unidirectional transmission channel allowing transmission of the flight log from the UAV to the mobile terminal.

After the UAV receives the log transmission channel establishment instruction, establishing the log transmission channel according to the log transmission channel establishment instruction includes: establishing a connection between the flight control system and the first image transmission module, and establishing a connection between the first image transmission module and the second image transmission module, to form the log transmission channel among the flight control system, the first image transmission module and the second image transmission module.

S230: Transmit a flight log to the mobile terminal by using the log transmission channel and upload the flight log by using the mobile terminal.

In this embodiment of the present invention, the flight control system of the UAV generates the flight log, which may be transmitted to the mobile terminal by using the log transmission channel between the flight control system and the mobile terminal only after the log transmission channel is established.

The flight log is relevant data representing working statuses of devices and modules that is recorded in a specific data format during flight of the UAV, such as a current and an output power of a driving motor, a fully charged level and a remaining level of a battery, a measurement result (an attitude angle) of an inertial measurement module and the like.

In another embodiment of the present invention, since the UAV cannot ensure to be powered on but is not started for the mobile terminal to acquire the flight log from the UAV by using an image transmission connection, the UAV needs to ensure that the UAV is powered on but is not started before the log transmission channel is established, to ensure that the UAV does not generate a new flight log, so that the flight log can be completely uploaded.

The expression "the UAV is powered on but is not started" means that the UAV is still stationary on the ground and does not fly after being powered on.

The UAV flies by means of rotation of a propeller. The rotation of the propeller is controlled by a driving motor. If the driving motor is started, the propeller rotates, and the UAV flies or hovers. If the driving motor is not started, the propeller does not rotate, and the UAV lands on the ground and remains stationary. Therefore, the UAV may determine whether the UAV is powered on but is not started by determining a status of the driving motor. If the UAV is powered on and the driving motor is started, it is determined that the UAV is powered on and started. If the UAV is powered on but the driving motor is not started, it is determined that the UAV is powered on but is not started.

The UAV may determine the status of the driving motor according to a current of the driving motor. If the current of the driving motor is 0, it is determined that the driving motor is not started. If the current of the driving motor is greater than 0, it is determined that the driving motor is started.

In still another embodiment of the present invention, when it is determined that the acquisition of the flight log is completed, the log transmission channel is cut off and a cutoff indication is transmitted to the mobile terminal.

The UAV may determine whether the transmission of the flight log is completed according to a size of data that has been transmitted. If the size of the data that has been transmitted is less than a size of the flight log generated by the flight control system, it is determined that the transmission of the flight log is not completed, or otherwise, it is determined that the transmission of the flight log is completed.

The UAV may cutoff the log transmission channel by disconnecting the flight control system from the first image transmission module.

After cutting off the log transmission channel, the UAV transmits a cutoff indication to the mobile terminal by using the wireless network connection with the mobile terminal, so that the mobile terminal uploads the flight log to the server according to the cutoff indication.

In this embodiment of the present invention, after establishing the log transmission channel according to the log transmission channel establishment instruction transmitted from the mobile terminal, the UAV transmits the flight log by using the log transmission channel, so that the flight log does not exist in the mobile terminal when the user operates the mobile terminal, which can prevent the user from performing operations on the flight log and can improve an accuracy of flight log uploading.

Embodiment IV

The following term "unit" may refer to a combination of software and/or hardware having a predetermined function. Although the apparatus described in the following embodiments may be implemented by using software, it is also conceivable that the apparatus may be implemented by using hardware, or a combination of software and hardware.

Figure 6:
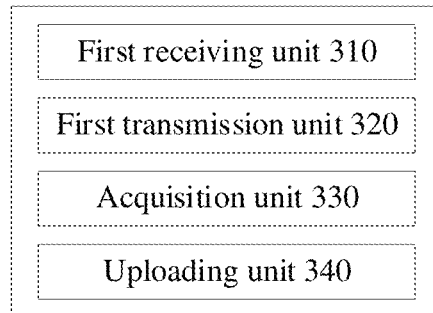
FIG. 6 is a schematic structural diagram of a flight log uploading device applicable to a mobile terminal according to an embodiment of the present invention.

FIG. 6 is a schematic structural diagram of a flight log uploading device applicable to a mobile terminal according to an embodiment of the present invention. The mobile terminal is the mobile terminal 30 described in the foregoing embodiment. The flight log uploading device includes:

a first receiving unit 310, configured to receive a trigger operation from a user, the trigger operation being used to confirm a flight log uploading instruction;

a first transmission unit 320, configured to transmit a log transmission channel establishment instruction to a UAV according to the flight log uploading instruction, so that the UAV establishes a log transmission channel, where the UAV is communicatively connected to the mobile terminal;

an acquisition unit 330, configured to acquire a flight log of the UAV by using the log transmission channel; and an uploading unit 340, configured to upload the flight log to a server.

The log transmission channel is a communication link established among a flight control system of the UAV, a first image transmission module of the UAV and a second image transmission module of the mobile terminal.

Further, the acquisition unit 330 is configured to:

store the flight log in an encrypted storage area, where the encrypted storage area is a read-only storage area.

The uploading unit 340 is further configured to:

upload the flight log to the server by using the encrypted storage area.

Further, the first receiving unit 310 is further configured to:

receive a cutoff indication transmitted from the UAV to determine that the acquisition of the flight log is completed.

Certainly, in some other alternative embodiments, the first receiving unit 310 may be an input/output device of the mobile terminal, and the first transmission unit 320, the acquisition unit 330 and the uploading unit 340 may be processors.

The apparatus embodiment and the method embodiment are based on the same concept. Therefore, for the content of the apparatus embodiment, reference may be made to the method embodiment without mutual conflict among content, and details are not described herein again.

In this embodiment of the present invention, the mobile terminal controls, by using the received trigger operation, the UAV to establish the log transmission channel, and then acquires the flight log of the UAV by using the log transmission channel, so that the flight log does not exist in the mobile terminal when the user operates the mobile terminal, which can prevent the user from performing operations on the flight log and can improve an accuracy of flight log uploading.

Embodiment V

The following term "unit" may refer to a combination of software and/or hardware having a predetermined function. Although the apparatus described in the following embodiments may be implemented by using software, it is also conceivable that the apparatus may be implemented by using hardware, or a combination of software and hardware.

Figure 7:
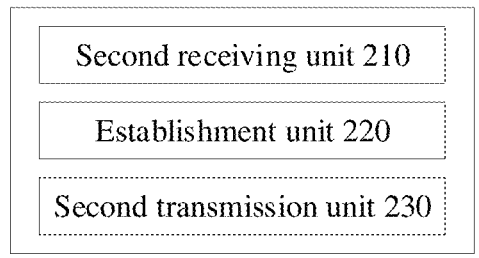
FIG. 7 is a schematic structural diagram of a flight log uploading device applicable to a UAV according to an embodiment of the present invention.

FIG. 7 is a schematic structural diagram of a flight log uploading device applicable to a UAV according to an embodiment of the present invention. The UAV is the UAV 20 described in the foregoing embodiment. The flight log uploading device includes:

a second receiving unit 210, configured to receive a log transmission channel establishment instruction transmitted from a mobile terminal, where the mobile terminal is communicatively connected to the UAV;

an establishment unit 220, configured to establish a log transmission channel according to the log transmission channel establishment instruction; and a second transmission unit 230, configured to transmit a flight log to the mobile terminal by using the log transmission channel and upload the flight log by using the mobile terminal.

When the UAV includes a flight control system and a first image transmission module, and the mobile terminal includes a second image transmission module, the establishment unit 220 is further configured to:

establish a connection between the flight control system and the first image transmission module according to the log transmission channel establishment instruction; and connect the first image transmission module to the second image transmission module to form the log transmission channel among the flight control system, the first image transmission module and the second image transmission module.

Figure 8:
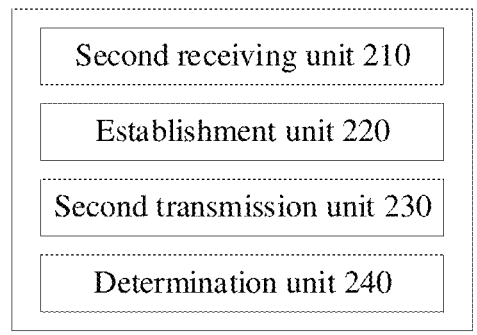
FIG. 8 is a schematic structural diagram of a flight log uploading device applicable to a UAV according to another embodiment of the present invention.

Further, referring to FIG. 8, the flight log uploading device includes:

a determination unit 240, configured to determine that the UAV is powered on but is not started, to ensure that the UAV does not generate a new flight log.

The determination unit 240 is further configured to:

cut off the log transmission channel and transmit a cutoff indication to the mobile terminal when it is determined that the transmission of the flight log is completed.

Certainly, in some other alternative embodiments, the second receiving unit 210, the establishment unit 220, the second transmission unit 230 and the determination unit 240 may be flight control chips.

The apparatus embodiment and the method embodiment are based on the same concept. Therefore, for the content of the apparatus embodiment, reference may be made to the method embodiment without mutual conflict among content, and details are not described herein again.

In this embodiment of the present invention, after establishing the log transmission channel according to the log transmission channel establishment instruction transmitted from the mobile terminal, the UAV transmits the flight log by using the log transmission channel, so that the flight log does not exist in the mobile terminal when the user operates the mobile terminal, which can prevent the user from performing operations on the flight log and can improve an accuracy of flight log uploading.

Embodiment VI

Figure 9:
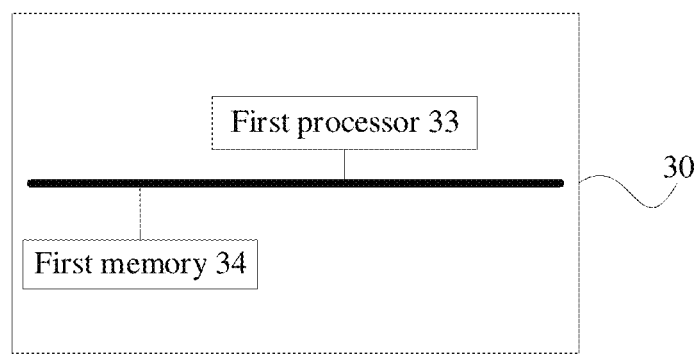
FIG. 9 is a schematic diagram of a hardware structure of a mobile terminal according to an embodiment of the present invention.

FIG. 9 is a schematic diagram of a hardware structure of a mobile terminal according to an embodiment of the present invention. Hardware modules provided in this embodiment of the present invention may be integrated into the mobile terminal 30 described in the foregoing embodiments, so that the mobile terminal 30 can perform the flight log uploading method described in the foregoing embodiments and can achieve functions of the modules of the flight log uploading device described in the foregoing embodiments. The mobile terminal 30 includes:

one or more first processors 33 and a first memory 34. In FIG. 9, one first processor 33 is used as an example.

The first processor 33 and the first memory 34 may be connected through a bus or in other manners and are, for example, connected through a bus in FIG. 9.

As a non-volatile computer-readable storage medium, the first memory 34 may be configured to store a non-volatile software program, a non-volatile computer-executable program, and a module, for example, program instructions corresponding to the flight log uploading method and the modules (for example, the first receiving unit 310, the first transmission unit 320, the acquisition unit 330, the uploading unit 340 and the like) corresponding to the flight log uploading device in the foregoing embodiments of the present invention. The processor 33 executes various functional applications and data processing of the flight log uploading method by executing a non-volatile software program, an instruction, and a module stored in the first memory 34, that is, implements the flight log uploading method in the foregoing method embodiments and the functions of the modules in the foregoing device embodiments.

The first memory 34 may include a program storage area and a data storage area. The program storage area may store an operating system and application programs required for at least one function, and the data storage area may store data created according to the use of the flight log uploading device.

In addition, the first memory 34 may include a high-speed random access memory, and may further include a nonvolatile memory, such as at least one magnetic disk storage device, a flash memory, or another volatile solid-state storage device. In some embodiments, the first memory 34 optionally includes memories remotely disposed relative to the first processor 33, and these remote memories may be connected to the first processor 33 by using a network. Examples of the network include, but are not limited to, the Internet, an intranet, a local area network, a mobile communications network, and a combination thereof.

The program instructions and the one or more modules are stored in the first memory 34, which, when executed by the one or more first processors 33, perform the steps of the flight log uploading method in any of the foregoing method embodiments or achieve the functions of the modules of the flight log uploading device in any of the foregoing device embodiments.

For the foregoing product, the method provided in the embodiments of the present invention may be performed, and the corresponding functional modules for performing the method and beneficial effects thereof are provided. For technical details not described in detail in this embodiment, reference may be made to the method provided in the foregoing embodiments of the present invention.

An embodiment of the present invention further provides a non-volatile computer-readable storage medium storing computer-executable instructions. The computer-executable instructions, when executed by one or more processors, for example, the first processor 33 in FIG. 9, cause a computer to perform the steps of the flight log uploading method in any of the foregoing method embodiments or achieve the functions of the modules of the flight log uploading device in any of the foregoing device embodiments.

An embodiment of the present invention further provides a computer program product including a computer program stored in a non-volatile computer-readable storage medium. The computer program includes program instructions, which, when executed by one or more processors, for example, the first processor 33 in FIG. 9, cause a computer to perform the steps of the flight log uploading method in any of the foregoing method embodiments or achieve the functions of the modules of the flight log uploading device in any of the foregoing device embodiments.

The described apparatus embodiment is merely an example. The modules described as separate parts may or may not be physically separate, and parts displayed as modules may or may not be physical units, may be located in one position, or may be distributed on a plurality of network units. Some or all of the modules may be selected according to actual needs to achieve the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that all or some of the processes of the methods in the foregoing embodiments may be implemented by a computer program instructing relevant hardware. The program may be stored in a computer-readable storage medium. During execution of the program, processes of the foregoing method embodiments may be included. The foregoing storage medium may be a magnetic disk, an optical disc, a read-only memory (ROM), a random access memory (RAM) or the like.

Embodiment VII

Figure 10:
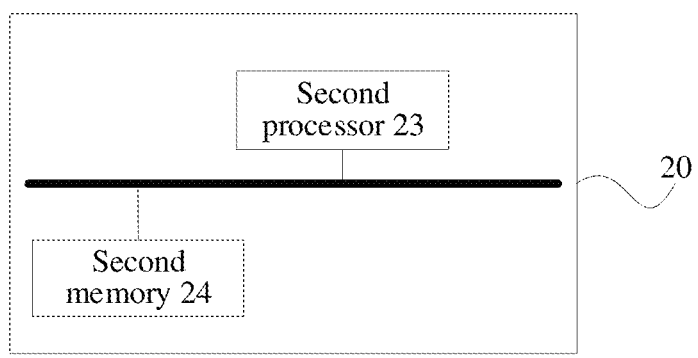
FIG. 10 is a schematic diagram of a hardware structure of a UAV according to an embodiment of the present application.

FIG. 10 is a schematic diagram of a hardware structure of a UAV according to an embodiment of the present invention. Hardware modules provided in this embodiment of the present invention may be integrated into the flight control system 21 described in the foregoing embodiments, so that the UAV 20 can perform the flight log uploading method described in the foregoing embodiments and can achieve functions of the modules of the flight log uploading device described in the foregoing embodiments. The UAV 20 includes:

one or more second processors 23 and a second memory 24. In FIG. 10, one processor 23 is used as an example.

The second processor 23 and the second memory 24 may be connected by using a bus or in another manner. A connection by using the bus is used as an example in FIG. 10.

As a non-volatile computer-readable storage medium, the second memory 24 may be configured to store a non-volatile software program, a non-volatile computer-executable program, and a module, for example, program instructions corresponding to the flight log uploading method and the modules (for example, the second receiving unit 210, the establishment unit 220, the second transmission unit 230 and the like) corresponding to the flight log uploading device in the foregoing embodiments of the present invention. The second processor 23 executes various functional applications and data processing of the flight log uploading method by executing a non-volatile software program, an instruction, and a module stored in the second memory 24, that is, implements the flight log uploading method in the foregoing method embodiments and the functions of the modules in the foregoing device embodiments.

The second memory 24 may include a program storage area and a data storage area. The program storage area may store an operating system and application programs required for at least one function, and the data storage area may store data created according to the use of the flight log uploading device and is configured to store a flight log.

In addition, the second memory 24 may include a high-speed random access memory, and may further include a nonvolatile memory, such as at least one magnetic disk storage device, a flash memory, or another volatile solid-state storage device. In some embodiments, the second memory 24 optionally includes memories remotely disposed relative to the second processor 23, and these remote memories may be connected to the second processor 23 by using a network. Examples of the network include, but are not limited to, the Internet, an intranet, a local area network, a mobile communications network, and a combination thereof.

The program instructions and the one or more modules are stored in the second memory 24, which, when executed by the one or more second processors 23, perform the steps of the flight log uploading method in any of the foregoing method embodiments or achieve the functions of the modules of the flight log uploading device in any of the foregoing device embodiments.

Certainly, in some alternative embodiments, the flight control system 21 may directly act as the second processor 23 to perform the flight log uploading method described in the foregoing embodiments, so as to achieve the functions of the modules of the flight log uploading device described in the foregoing embodiments.

For the foregoing product, the method provided in the embodiments of the present invention may be performed, and the corresponding functional modules for performing the method and beneficial effects thereof are provided. For technical details not described in detail in this embodiment, reference may be made to the method provided in the foregoing embodiments of the present invention.

An embodiment of the present invention further provides a non-volatile computer-readable storage medium storing computer-executable instructions. The computer-executable instructions, when executed by one or more processors, for example, the second processor 23 in FIG. 10, cause a computer to perform the steps of the flight log uploading method in any of the foregoing method embodiments or achieve the functions of the modules of the flight log uploading device in any of the foregoing device embodiments.

An embodiment of the present invention further provides a computer program product including a computer program stored in a non-volatile computer-readable storage medium. The computer program includes program instructions, which, when executed by one or more processors, for example, the second processor 23 in FIG. 10, cause a computer to perform the steps of the flight log uploading method in any of the foregoing method embodiments or achieve the functions of the modules of the flight log uploading device in any of the foregoing device embodiments.

The described apparatus embodiment is merely an example. The modules described as separate parts may or may not be physically separate, and parts displayed as modules may or may not be physical units, may be located in one position, or may be distributed on a plurality of network units. Some or all of the modules may be selected according to actual needs to achieve the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that all or some of the processes of the methods in the foregoing embodiments may be implemented by a computer program instructing relevant hardware. The program may be stored in a computer-readable storage medium. During execution of the program, processes of the foregoing method embodiments may be included. The foregoing storage medium may be a magnetic disk, an optical disc, a read-only memory (ROM), a random access memory (RAM) or the like.

The foregoing descriptions are embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

Finally, it should be noted that the foregoing embodiments are merely intended for describing the technical solutions of the present invention rather than limiting the present invention. Under the ideas of the present invention, the technical features in the foregoing embodiments or different embodiments may also be combined, the steps may be performed in any order, many other changes of different aspects of the present invention also exist as described above, and these changes are not provided in detail for simplicity. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not make the essence of corresponding technical solutions depart from the scope of the technical solutions of the embodiments of the present invention.

What is claimed is:

1. A flight log uploading method, applicable to a mobile terminal, wherein the method comprises:
configuring the mobile terminal with a flight log uploading button;
receiving, from a user, a trigger operation for the flight log uploading button, the trigger operation for the flight log uploading button being used to confirm a flight log uploading instruction;
transmitting a log transmission channel establishment instruction to an unmanned aerial vehicle (UAV) according to the flight log uploading instruction; and
acquiring a flight log of the UAV by using a log transmission channel and synchronously uploading the flight log to a server.

2. The method according to claim 1, wherein the log transmission channel is a communication link established among a flight control system of the UAV, a first image transmission module of the UAV and a second image transmission module of the mobile terminal.

3. The method according to claim 1, wherein before the acquiring a flight log of the UAV by using a log transmission channel and synchronously uploading the flight log to a server, the method further comprises:
storing the flight log in an encrypted storage area, wherein the encrypted storage area is a read-only storage area; and
the synchronously uploading the flight log to a server comprises:
synchronously uploading the flight log to the server by using the encrypted storage area.

4. The method according to claim 3, wherein before the synchronously uploading the flight log to the server by using the encrypted storage area, the method further comprises:
receiving a cutoff indication transmitted from the UAV to determine that the acquisition of the flight log is completed.

5. A flight log uploading method, applicable to an unmanned aerial vehicle (UAV), wherein the method comprises:
receiving a log transmission channel establishment instruction transmitted from a mobile terminal, wherein the mobile terminal is communicatively connected to the UAV;
establishing a log transmission channel according to the log transmission channel establishment instruction; and
transmitting a flight log to the mobile terminal by using the log transmission channel and synchronously uploading the flight log to a server by using the mobile terminal.

6. The method according to claim 5, wherein the UAV comprises a flight control system and a first image transmission module, the mobile terminal comprises a second image transmission module, and the establishing a log transmission channel according to the log transmission channel establishment instruction comprises:
establishing a connection between the flight control system and the first image transmission module according to the log transmission channel establishment instruction; and
connecting the first image transmission module to the second image transmission module to form the log transmission channel among the flight control system, the first image transmission module and the second image transmission module.

7. The method according to claim 5, wherein before the establishing a log transmission channel according to the log transmission channel establishment instruction, the method further comprises:
determining that the UAV is powered on but is not started, to ensure that the UAV does not generate a new flight log.

8. The method according to claim 5, further comprising:
cutting off the log transmission channel and transmitting a cutoff indication to the mobile terminal when it is determined that the transmission of the flight log is completed.

9. A flight log uploading device, applicable to a mobile terminal, wherein the mobile terminal is configured with a flight log uploading button, and the device comprises:
a memory, configured to store a computer-executable flight log uploading method program; and
a processor, configured to invoke the computer-executable flight log uploading method program to:
receive, from a user, a trigger operation for the flight log uploading button, the trigger operation for the flight log uploading button being used to confirm a flight log uploading instruction;
transmit a log transmission channel establishment instruction to an unmanned aerial vehicle (UAV) according to the flight log uploading instruction, so that the UAV establishes a log transmission channel, wherein the UAV is communicatively connected to the mobile terminal;
acquire a flight log of the UAV by using the log transmission channel; and
synchronously upload the flight log to a server.

10. The device according to claim 9, wherein the log transmission channel is a communication link established among a flight control system of the UAV, a first image transmission module of the UAV and a second image transmission module of the mobile terminal.

11. The device according to claim 9, wherein the processor is further configured to:
store the flight log in an encrypted storage area, wherein the encrypted storage area is a read-only storage area; and
synchronously upload the flight log to the server by using the encrypted storage area.

12. The device according to claim 11, wherein the processor is further configured to:
receive a cutoff indication transmitted from the UAV to determine that the acquisition of the flight log is completed.

13. A flight log uploading device, applicable to an unmanned aerial vehicle (UAV), wherein the device comprises:
a memory, configured to store a computer-executable flight log uploading method program; and
a processor, configured to invoke the computer-executable flight log uploading method program to:
receive a log transmission channel establishment instruction transmitted from a mobile terminal, wherein the mobile terminal is communicatively connected to the UAV;
establish a log transmission channel according to the log transmission channel establishment instruction; and
transmit a flight log to the mobile terminal by using the log transmission channel and synchronously upload the flight log to a server by using the mobile terminal.

14. The device according to claim 13, wherein the UAV comprises a flight control system and a first image transmission module, the mobile terminal comprises a second image transmission module, and the processor is further configured to:
establish a connection between the flight control system and the first image transmission module according to the log transmission channel establishment instruction; and
connect the first image transmission module to the second image transmission module to form the log transmission channel among the flight control system, the first image transmission module and the second image transmission module.

15. The device according to claim 13, wherein the processor is further configured to:
determine that the UAV is powered on but is not started, to ensure that the UAV does not generate a new flight log.

16. The device according to claim 13, wherein the processor is further configured to:
cut off the log transmission channel and transmit a cutoff indication to the mobile terminal when it is determined that the transmission of the flight log is completed.

17. A mobile terminal, comprising:
at least one processor; and
a memory communicatively connected to the at least one processor, wherein
the memory stores instructions executable by the at least one processor, the instructions, when executed by the at least one processor, causing the at least one processor to perform the following steps:
configuring the mobile terminal with a flight log uploading button;
receiving, from a user, a trigger operation for the flight log uploading button, the trigger operation for the flight log uploading button being used to confirm a flight log uploading instruction;
transmitting a log transmission channel establishment instruction to an unmanned aerial vehicle (UAV) according to the flight log uploading instruction; and
acquiring a flight log of the UAV by using a log transmission channel and synchronously uploading the flight log to a server.

18. A non-volatile computer-readable storage medium, storing computer-executable instructions, the computer-executable instructions being used to cause a mobile terminal to perform the following steps:
configuring the mobile terminal with a flight log uploading button;
receiving, from a user, a trigger operation for the flight log uploading button, the trigger operation for the flight log uploading button being used to confirm a flight log uploading instruction;
transmitting a log transmission channel establishment instruction to an unmanned aerial vehicle (UAV) according to the flight log uploading instruction; and
acquiring a flight log of the UAV by using a log transmission channel and synchronously uploading the flight log to a server.

19. An unmanned aerial vehicle (UAV), comprising:
at least one processor; and
a memory communicatively connected to the at least one processor, wherein
the memory stores instructions executable by the at least one processor, the instructions, when executed by the at least one processor, causing the at least one processor to perform the following steps:
receiving a log transmission channel establishment instruction transmitted from a mobile terminal, wherein the mobile terminal is communicatively connected to the UAV;
establishing a log transmission channel according to the log transmission channel establishment instruction; and
transmitting a flight log to the mobile terminal by using the log transmission channel and synchronously uploading the flight log to a server by using the mobile terminal.

20. A non-volatile computer-readable storage medium, storing computer-executable instructions, the computer-executable instructions being used to cause an unmanned aerial vehicle (UAV) to perform the following steps:
receiving a log transmission channel establishment instruction transmitted from a mobile terminal, wherein the mobile terminal is communicatively connected to the UAV;
establishing a log transmission channel according to the log transmission channel establishment instruction; and
transmitting a flight log to the mobile terminal by using the log transmission channel and synchronously uploading the flight log to a server by using the mobile terminal.

* * * * *